(No Model.)
S. H. RAYMOND.
COMBINED HARROW AND SEEDER.
No. 532,426. Patented Jan. 8, 1895.
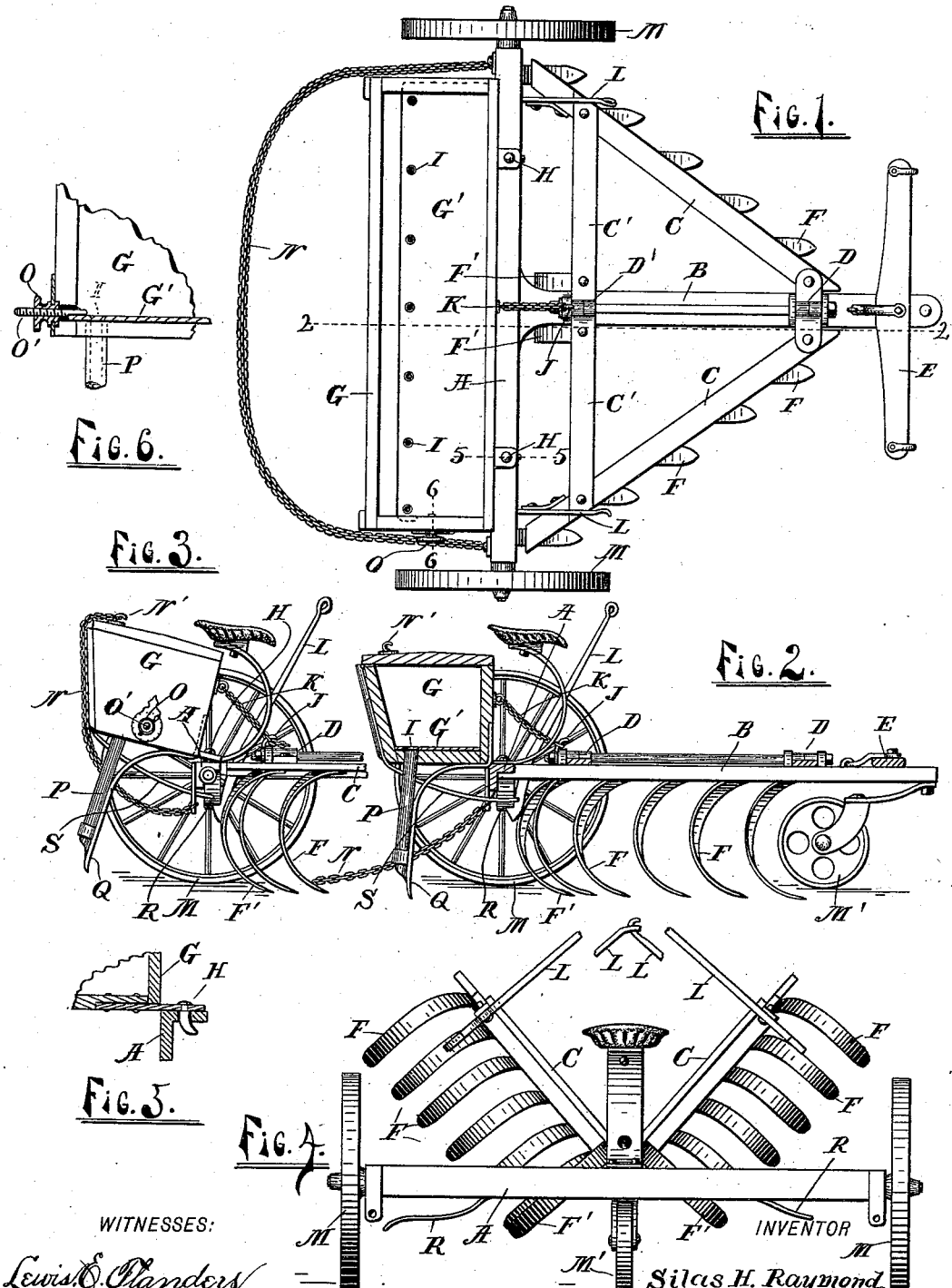
WITNESSES:
Lewis E. Flanders
Lois Moulton
INVENTOR
Silas H. Raymond
BY
Luther V. Moulton,
ATTORNEY.

UNITED STATES PATENT OFFICE.

SILAS H. RAYMOND, OF GRAND RAPIDS, MICHIGAN, ASSIGNOR TO FRANCIS M. SANDERSON, OF SAME PLACE.

COMBINED HARROW AND SEEDER.

SPECIFICATION forming part of Letters Patent No. 532,426, dated January 8, 1895.

Application filed April 12, 1894. Serial No. 507,260. (No model.)

*To all whom it may concern:*

Be it known that I, SILAS H. RAYMOND, a citizen of the United States, residing at Grand Rapids, in the county of Kent and State of Michigan, have invented certain new and useful Improvements in a Combined Harrow and Seeder; and I do hereby declare the following to be a full, clear, and exact description of the invention, such as will enable others skilled in the art to which it appertains to make and use the same.

My invention relates to an improved combined harrow and seeder, and its object is to provide the same with certain new and useful features, hereinafter more fully described and particularly pointed out in the claims, reference being had to the accompanying drawings, in which—

Figure 1 is a plan view of my invention with the cover of the seed box removed. Fig. 2 is a vertical section of the same on the line 2—2 of Fig. 1; Fig. 3, a detail in side elevation, showing the seeder out of action. Fig. 4 is a rear end elevation with the seed dropping mechanism removed, and shows the teeth as elevated and held in elevated position by the engagement of the hooked ends of the elevating levers with each other, a part of said levers being shown as removed to reduce space; Fig. 5, a detail showing a vertical section on the line 5—5 of Fig. 1, illustrating the detachable fastening for the seeder mechanism; and Fig. 6 a detail showing the mechanism for adjusting the feed slide G'.

Like letters refer to like parts in all of the figures.

The main frame consists of a transverse beam A, and a beam B extending forward from the middle of the beam A. This frame is supported on side wheels M, M, journaled on each end of the beam A, and a forward caster wheel M', supporting the forward end of the beam B.

Diverging bars C C, are hinged near their forward ends to the beam B as at D and held in diagonal position relative to said beam by transverse brace bars C' attached at their outer ends to the bars C, and hinged at their inner ends to the beam B as at D'. To said bars C, C, are attached a series of harrow teeth F, and two similar teeth F' are attached to the brace bars C', to follow the caster wheel M' and act on the middle strip left between the teeth on the bars C C. Said hinges D, D' permit the bars C, C, to swing vertically and near the respective rear ends of said bars are pivoted levers L, L, provided with suitable engaging hooks at their upper ends, which hooks when the bars C are elevated will engage and support the same in position as in Fig. 4, thus throwing the harrow teeth out of action. Said levers L, L, are also prolonged downward and provided with hooks near their lower ends, which hooks engage springs R, R, attached to the beam A, and thus hold the teeth F in working contact with the soil and at the same time yielding to any great obstruction which tends to raise the bars C', C'.

The box G, is to contain the seed, grain, or other material to be distributed and is detachably and pivotally connected near its lower forward angle to the beam A by suitable pins H, which loosely engage suitable holes in said beam. Beneath said box is a series of flexible drill teeth Q at the rear of which teeth are flexible tubes P open at both ends and connecting with the interior of the box G to convey the seed, &c., to the immediate rear of the respective drill teeth. The flow of said seed is regulated or cut off by a slide G' having a series of openings I, corresponding to the respective openings in the upper ends of the tubes P. Said slide G' is adjusted by a rotative nut O, which engages a screw threaded stud O' attached to said slide. The slide G' thus is moved to bring the openings I more or less directly over the tubes and the flow of seed thus regulated, or cut off. A drag chain N attached at its respective ends to the beam A covers the seed; and when out of use said chain is supported by a hook N' on the top of the box G. A chain K is attached near the upper part of the box G and extends forward and engages a hook J on the beam B. Said chain limits the downward movement of the rear of the box G when in action, and when hooked up shorter supports said box, with its rear elevated when out of action as in Fig. 3. Springs S are attached to said box at the rear and extend forward and engage the springs R, whereby the drill teeth Q are held in contact with the earth and permitted to rise to pass obstructions. The box G being pivotally connected to the beam A at the front, is vibrated vertically at the rear by the action of the drill teeth and thus the flow of seed maintained in the tubes P.

By the construction, either the harrow or the drill, or both may be easily thrown out of action. The box G and also all the parts attached may also be easily lifted off and separated from the balance of the machine leaving the latter a complete operative harrow, or cultivator.

What I claim is—

1. In combination with a suitable frame supported upon wheels, diverging bars hinged to swing vertically and having harrow teeth attached, and levers attached to said bars having hooks to engage and support said bars in an elevated position, substantially as described.

2. In combination, a frame consisting of a transverse beam, and a beam projecting from the middle of the same; wheels supporting said frame, diverging bars and brace bars hinged to swing vertically, harrow teeth on said bars, levers pivoted to said bars and having engaging hooks at the upper ends, and hooks near their lower ends, and springs on the frame engaged by said lower hooks, substantially as described.

3. In combination with a harrow, substantially as described, a seed box pivotally attached near its lower forward angle to the transverse beam of the harrow frame, flexible drill teeth attached to said box, flexible tubes extending from the interior of said box to the rear of said drill teeth, and an adjustable slide to partially or wholly open or close the upper end of said tubes, substantially as described.

4. In combination with a harrow, substantially as described, a seed box pivotally and detachably connected near its lower forward angle to the transverse beam of said harrow, flexible drill teeth beneath said box and attached thereto, flexible tubes extending from the interior of said box to the rear of said teeth, an adjustable slide partially or wholly opening and closing said tubes, a chain extending forward from the upper forward part of said box and attached to the harrow frame, and a drag chain attached to said harrow, substantially as described.

5. In combination with a harrow substantially as described, a seed box pivotally connected near its lower forward angle to the frame of said harrow and having a supporting chain, flexible drill teeth, flexible tubes, and a slide to open and close said tubes, springs attached to said box and connected to said frame whereby said drill teeth are forced in contact with the soil, substantially as described.

6. A combined harrow and seeder, consisting of a suitable frame supported upon wheels, diverging bars having harrow teeth attached and pivoted to swing vertically, levers on said bars, and having engaging hooks at their upper ends, and hooks at their lower ends, springs on said frame engaged by said lower hooks, a detachable seed box pivoted near its lower forward angle to said frame and having attached a supporting chain, flexible drill teeth attached to said box, flexible tubes extending from the interior of the seed box to the rear of said teeth, and an adjustable slide to partially, or wholly open or close said tubes, and a drag chain to cover the seed, substantially as described.

7. In a harrow, the combination with the frame, the bars hinged to swing vertically, and the harrow teeth attached to said bars, of levers engaging said bars and having hooks which are designed to engage each other and thereby hold said bars elevated, and springs with which the lower ends of said levers are engaged when the teeth are in operative position, substantially as shown and for the purposes specified.

8. The combination with the frame, and the hinged bars supporting the teeth, of a spring secured to the frame, and the lever for elevating the bars, said lever having its lower end engaged with said spring when the teeth are in operative position, for the purpose specified.

9. The combination with the frame, the flexible drill teeth, and the flexible seed-conducting tubes, of the seed-box, connected with said teeth and tubes, said box being pivoted at one end whereby it may vibrate under the action of said teeth, substantially as described and for the purposes specified.

10. The combination with the frame, the flexible drill-teeth, and the flexible seed-conducting tubes, of the seed box-pivoted at one end, and springs connected with said seed box, substantially as described and for the purposes specified.

In testimony whereof I affix my signature in presence of two witnesses.

SILAS H. RAYMOND.

Witnesses:
LUTHER V. MOULTON,
LOIS MOULTON.